(12) United States Patent
Zeller

(10) Patent No.: US 6,473,445 B1
(45) Date of Patent: Oct. 29, 2002

(54) GAS LASER

(75) Inventor: Thomas Zeller, Sindelfingen (DE)

(73) Assignee: Trumpf Lasertechnik GmbH (DE)

( * ) Notice: Subject to any disclaimer, the term of this patent is extended or adjusted under 35 U.S.C. 154(b) by 0 days.

(21) Appl. No.: 09/807,049

(22) PCT Filed: Aug. 5, 2000

(86) PCT No.: PCT/EP00/07627

§ 371 (c)(1),
(2), (4) Date: May 18, 2001

(87) PCT Pub. No.: WO01/11734

PCT Pub. Date: Feb. 15, 2001

(30) Foreign Application Priority Data

Aug. 5, 1999 (DE) .......................... 199 36 955

(51) Int. Cl.⁷ .............................................. H01S 3/097
(52) U.S. Cl. .............................. 372/87; 372/88; 372/58; 372/61; 372/34; 372/62
(58) Field of Search ............................. 372/58, 88, 87, 372/61, 62, 64, 35

(56) References Cited

U.S. PATENT DOCUMENTS

| | | | |
|---|---|---|---|
| 3,970,956 A | * | 7/1976 | Bolduc .................... 313/346 R |
| 4,064,465 A | | 12/1977 | Hundstad et al. |
| 4,152,672 A | | 5/1979 | Hundstad |
| 4,375,690 A | | 3/1983 | Tabata et al. |
| 4,639,926 A | * | 1/1987 | Wang et al. .................... 372/56 |
| 4,752,937 A | * | 6/1988 | Gorisch et al. ................ 372/34 |
| 5,353,299 A | * | 10/1994 | Martinen et al. ........... 372/103 |
| 6,285,703 B1 | * | 9/2001 | Schluter ....................... 372/95 |

FOREIGN PATENT DOCUMENTS

| | | |
|---|---|---|
| DE | 4102125 A1 | 8/1992 |
| DE | 4325063 C2 | 7/1997 |
| EP | 0 911 922 A1 | 8/1986 |
| EP | 0610170 A1 | 8/1994 |
| FR | 2.178.153 | 3/1973 |
| JP | 61-188979 | 9/1988 |
| JP | 63-229876 | 7/1997 |

* cited by examiner

Primary Examiner—Eddie Lee
Assistant Examiner—Matthew C. Landau

(57) ABSTRACT

A gas laser gas has an elongated cavity in which are disposed a first elongated electrode tube having an inner diameter, and a second elongated electrode tube disposed coaxially within the first electrode tube and having an outer diameter smaller than the inner diameter of the first electrode tube and spaced therefrom so as to provide a gas discharge chamber therebetween. The second electrode tube provides a gas exit chamber therewithin, and the first electrode tube is spaced from the wall of the cavity to provide a gas entry chamber thereabout. The electrode tubes permit gas to flow therethrough from the gas entry chamber to the gas exit chamber. The electrodes may be formed from a gas permeable material such as sintered metal, or formed from a non-permeable material with openings therein. The electrodes may have coolant flowing therethrough.

8 Claims, 5 Drawing Sheets

GAS LASER

BACKGROUND OF THE INVENTION

The present invention relates to gas lasers.

European Patent Publication 0610 170 discloses a gas laser which has a pair of concentric tubular electrodes providing a space therebetween functioning as a discharge chamber in which at least one laser beam runs in the direction in which the beam propagates. Laser gas flows through the chamber, and, the laser gas is supplied in the intake direction and taken out in the gas outlet direction. Although this type of laser construction offers some advantages, there has been recognized a need to increase its efficiency.

It is known that the performance and efficiency of a gas laser are highly dependent on the temperature of the laser gas in the discharge chamber. If a temperature limit, which is in the range of 200° C. to 300° C. for $CO_2$ lasers, is exceeded, there is a strong detrimental effect on the production of the laser beam. The temperature of the laser gas in the discharge chamber must therefore be kept under the limit mentioned. For this purpose, when the gas laser is operating, the discharge chamber is supplied with laser gas at a relatively low temperature, by means of which the temperature of the laser gas that occurs in the discharge chamber is set or by means of which laser gas heated during the laser process is forced out of the discharge chamber. The degree of cooling of the laser gas that can be achieved in the discharge chamber or the heat taken out of the discharge space is proportional to the volume of laser gas following through the discharge chamber. This in turn depends on the flow speed of the laser gas going through the discharge chamber and on the size of the flow cross section available for the laser gas. Since the length of the discharge chamber in the direction of beam propagation generally far exceeds the width of the discharge chamber, the laser gas to be taken out of the discharge chamber in the beam propagation direction has a relatively long distance to travel and this provides flux losses. As a result, the laser gas is fed to the discharge chamber at a relatively high flow speed, but this may result in high flow losses, which have a negative effect on the efficiency of the whole gas laser.

Accordingly, it is an object of the present invention to provide a novel gas laser in which there is provided improved control of the temperature of the lasing gas and higher efficiency.

It is also an object to provide such a gas laser in which the path of the laser gas through the laser discharge cavity is relatively short.

Another object is to provide such a laser which may be fabricated and operated relatively economically.

SUMMARY OF THE INVENTION

It has now been found that the foregoing and related objects may be readily attained in a gas laser having a housing providing an elongated cavity, a first elongated electrode tube within the cavity having an inner diameter and a second elongated electrode tube disposed coaxially within the first electrode tube and having an outer diameter smaller than the inner diameter of the first electrode tube and spaced therefrom so as to provide a gas discharge chamber therebetween. The second electrode tube provides a gas exit chamber therewithin, and the first electrode tube is spaced from the wall of the cavity to provide a gas entry chamber thereabout. Both electrode tubes permit gas to flow therethrough from the gas entry chamber to the gas exit chamber.

Also provided is laser gas circulating means for supplying laser gas to the gas entry chamber and for withdrawing laser gas from the exit chamber, and power supply means for producing a discharge between the electrodes to generate a laser beam travelling axially within the gas discharge chamber. Mirrors at the ends of the gas discharge chamber reflect the laser beam therebetween and provide an exit aperture for the laser beam.

In one embodiment, there is included in the cavity a grid member about the outer electrode tube to effect distribution of the laser gas along the length of the first electrode tube.

The electrode tubes may be fabricated from gas permeable material, and sintered conductive material permeable to the laser gas may be used therefor.

Alternatively, the electrode tubes may be fabricated from a material which is substantially gas impermeable and it has helical slits therein to permit the gas flow therethrough. In one embodiment, the electrode tubes are helical and the coils thereof are axially spaced.

The electrode tubes desirably provide passages for flow of coolant therethrough, and there is included coolant circulating means to provided flow of coolant therethrough.

The laser discharge chamber has at least one wall element extending thereabout and having openings therein for flow of the laser gas therethrough.

As will be appreciated, the flow path of the laser gas going through the discharge chamber of the gas laser is minimized in the interest of the smallest possible flow losses. When the laser discharge chamber is filled, the flow cross section is maximized with laser gas at a relatively low temperature. Because of the gas laser in the design of this invention, the whole generating surface of the electrode tube extending in the beam propagation direction is available for the laser gas exchange.

One important aspect of the invention is the design of the electrode tube through which the laser gas flows in the gas laser in the invention. Electrode tubes of sintered material offer very small resistance to the flow of laser gas, so that a slight pressure difference at the electrode tubes is enough to allow the laser gas to flow through them.

BRIEF DESCRIPTION OF THE ATTACHED DRAWINGS

DETAILED DESCRIPTION OF THE ILLUSTRATED EMBODIMENTS

Figure 1:
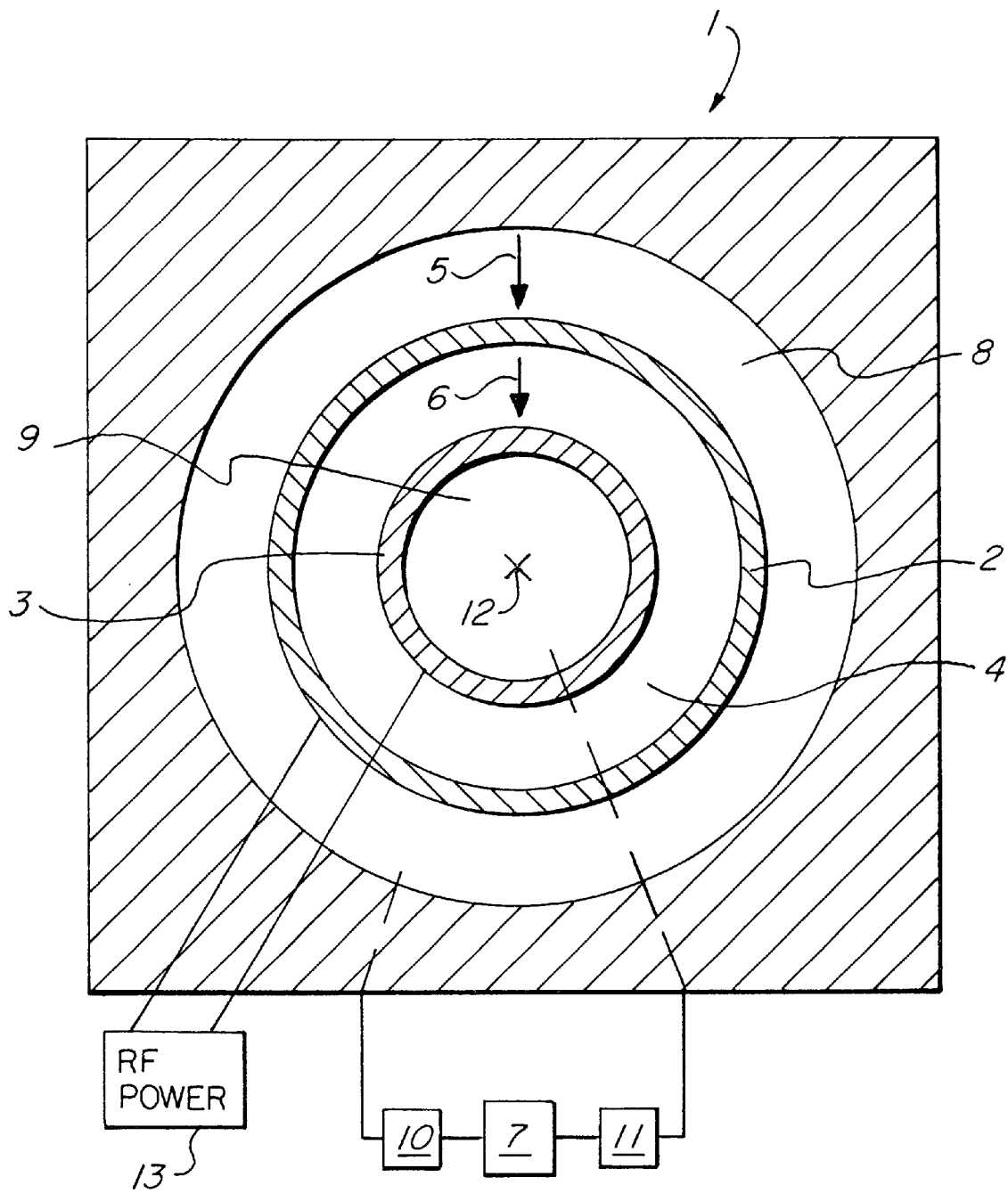
FIG. 1 is a partially diagrammatic cross sectional view of a laser tube assembly embodying the present invention.

Turning first to FIG. 1, FIG. 1 shows a gas laser with a coaxial design and electrodes in the form of concentric electrode tubes 2, 3. The latter are made of perforated sheet metal and form an annular intermediate chamber 4, which is used as the laser discharge chamber. Alternately, the electrode tubes 2, 3 can be composed of sintered metal.

As will be appreciated, electrode tube 2 is permeable to the laser gas in the gas intake direction shown by the arrow 5, and electrode tube 3 is permeable in the gas outlet direction shown by the arrow 6. Laser gas is pumped into the laser gas entry chamber 8 surrounding the tube 2 by a laser gas pump 7, from which it flows in the gas intake direction 5 through the outer electrode tube 2 into the discharge chamber 4. The heated laser gas is forced out of the laser discharge chamber 4 through the inner electrode tube 3 in the gas outlet direction 6 into the cylindrical laser gas outlet chamber 9 inside the inner electrode tube 3. From there, the heated laser gas is evacuated by the laser gas pump 7.

Laser gas coolers 10, 11 needed to cool the laser gas are connected in the lines by which the laser gas pump 7 is connected, to the laser gas entry chamber 8 and the laser gas exit chamber 9. Alternatively or in addition, laser gas coolers can be provided in the laser gas entry chamber 8 and the laser gas exit chamber 9. The laser gas stream produced by the laser gas pump 7 goes into the laser gas entry chamber 8 after passing through the laser gas cooler 10 in which it is cooled. Thence, it goes through the laser gas permeable electrode tube 2 into the discharge chamber 4 in the gas intake direction 5. The heated laser gas is withdrawn from the outlet space and passes through the laser gas cooler 11, is cooled and finally flows to the laser gas pump 7.

The laser beam produced in the discharge chamber 4 is propagated in the axial direction of the discharge chamber 4 and thus parallel to the axis of the cylindrical laser gas exit chamber 9. Accordingly, it is correct to give one and the same reference mark, here reference number 12, to the axis of the laser gas exit chamber 9 and the beam propagation direction. The electrode surfaces are at a distance from one another in a direction transverse to that direction and define the laser discharge chamber 4 of the gas laser 1 therebetween. The electrode surfaces also extend in the beam propagation direction 12.

A reflective mirror and a deflection mirror of conventional design border the ends of the discharge chamber 4 in the axial direction. A high-frequency (HF) generator 13 is connected in the usual way to the electrode tubes 2, 3 and applies a high-frequency alternating voltage to them to produce the laser beam.

Because of the laser gas permeability of electrode tubes 2,3 in the gas intake direction 5 and in gas outlet direction 6, heretofore described, the laser gas can effectively take the shortest path through the discharge chamber 4 with low flow resistance and at low flow speed. The laser gas temperature in the discharge chamber 4 can consequently be set at a level that guarantees high laser performance with good efficiency for the entire arrangement.

The special benefits of laser gas permeable electrode tubes crosswise to the beam propagation direction in the gas intake and outlet directions, in the case of coaxial gas lasers of the type shown in FIG. 1, result from the fact that the discharge chamber for such gas lasers 4 in FIG. 1, can frequently be relatively narrow with a relatively large axial distance in the propagation direction. As a result, there is substantial resistance to the laser gas flow in the beam propagation direction inside the discharge chamber.

When there are crosswise streams in coaxial gas lasers, as is shown in the case of the gas laser 1 in FIG. 1, a large flow cross section is available to the laser gas on both electrode tubes, whereby at the same time the flow path to be traveled by the laser gas inside the discharge chamber is very small.

Thus, for example, in the case of gas laser 1, a small difference between the pressure prevailing in laser gas entry chamber 8 and that in laser gas outlet chamber 9 is enough to guarantee that the laser gas will effectively pass through the discharge chamber 4. Last, but not least, because of this fact, the laser gas can be made to flow from the laser gas entry chamber 8 through the discharge chamber 4 into the laser gas exit chamber 9 by means of a medium flowing into the laser gas exit chamber 9 in the axial direction which draws the laser gas like a water jet pump through the electrode tubes 2,3 from outside to inside in FIG. 1.

The multiplicity of laser gas openings provided by the use of sintered material for the electrodes provides a flow cross section for the laser gas that approaches half the surface of the electrode tube that extends crosswise to the gas intake direction. Because of their electrically conductive properties, the sintered electrode tubes can be used to produce the electric field necessary for the laser gas discharge. The fact that the sintered electrode tubes can also be used as a distribution grid, i.e., as a device for producing a uniform laser gas flow, which is a special advantage.

Figure 2:
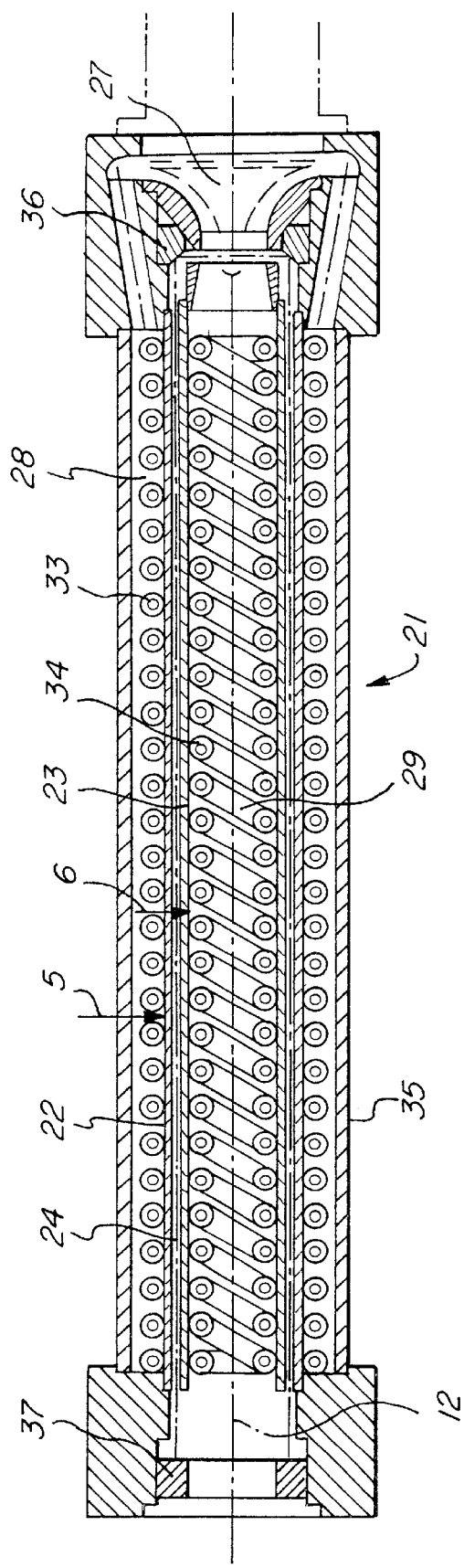
FIG. 2 is a longitudinal cross section of one embodiment of a laser tube assembly of the present invention.

The gas laser 21 shown in FIG. 2 has a discharge chamber 24 formed by a spatially annular intermediate chamber between electrode units in the form of coaxial electrode tubes 22, 23. In this embodiment the electrodes are sintered metal tubes. The outer electrode tube 22 is laser gas permeable in the gas intake direction 5, and the inner electrode tube 23 is permeable in the gas outlet direction. A cooling coil 33 carrying coolant runs on the outer wall of electrode tube 23, and a cooling coil 34 carrying coolant is disposed on the inner wall of electrode tube 23.

The laser gas is circulated as shown in FIG. 1 above. By means of a laser gas pump 27 in the form of a radial fan, laser gas is pushed into the laser gas entry chamber 28 inside the gas laser housing 35. After passing through the cooling coil 33 and being cooled, the laser gas goes through the outer electrode tube 22 in the gas intake direction 5 and reaches the discharge chamber 24. Heated laser gas flows, as a result, from the discharge chamber 24 in the gas outlet direction 6 through the inner electrode tube 23 into a laser gas exit chamber 29 and is cooled on its way by means of cooling coil 34. From the laser gas exit chamber 29, the laser gas is finally drawn in the axial direction of laser gas exit chamber 29 by means of laser gas pump 27. The laser beam is shown in dashed line in FIG. 2. The ends of the beam propagation direction 12 are defined by the reflective mirror 36 and the deflection mirror 37.

Figure 2A:
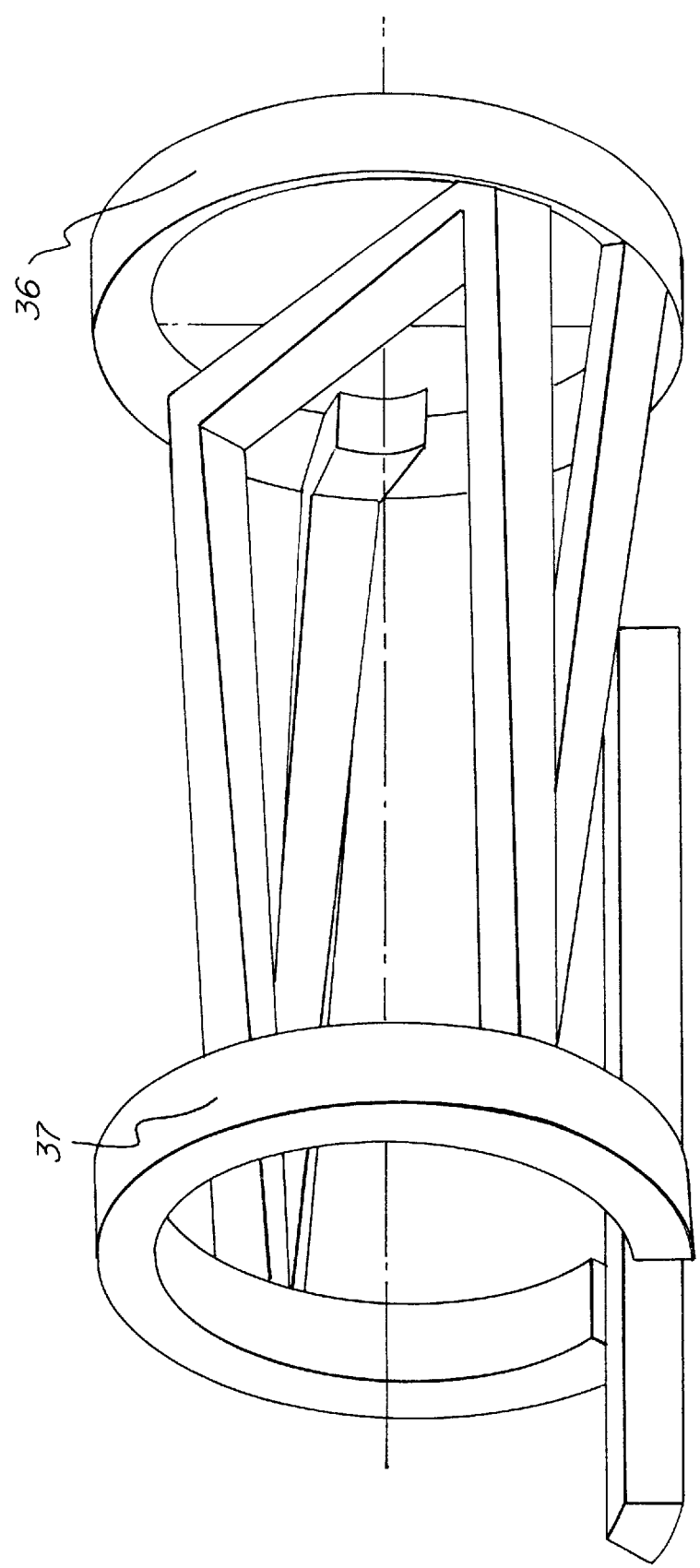
FIG. 2a is a diagrammatic view of the end mirrors and a partially ray trace of the laser beam.

The path of the laser beam inside the discharge chamber 24 is shown in detail in FIG. 2a. This radiation path is made possible by the design of the reflective mirror 36 and the deflection mirror 37. The reflective mirror 36 has a conical mirror surface and the surface of the deflection mirror 37 has a helical surface, both around the axis of the discharge chamber 24, shown in dashed line in FIG. 2a and rising in the direction of that axis.

Figure 3:
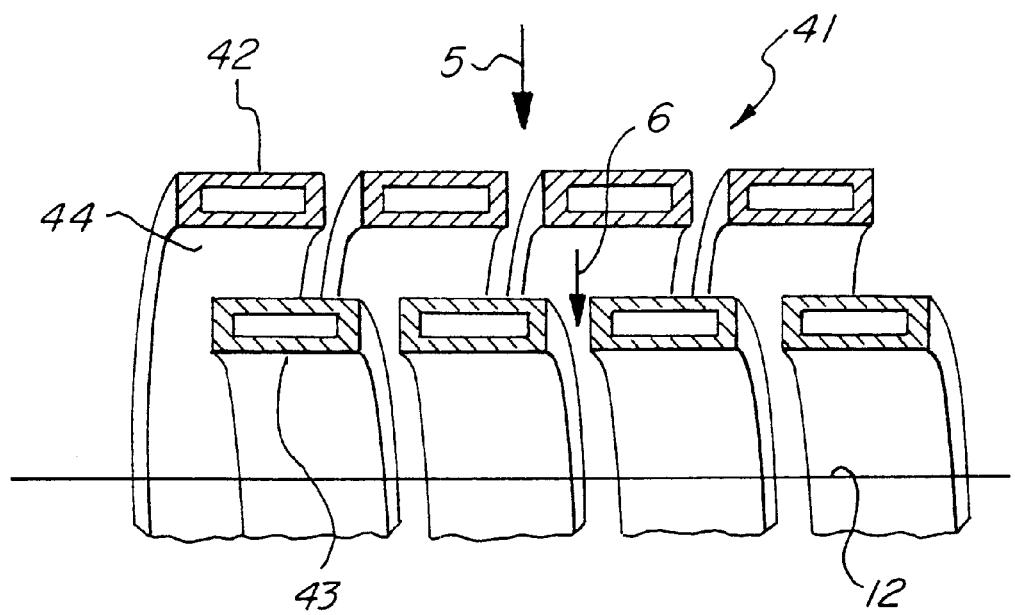
FIG. 3 is a fragmentary sectional view of one type of electrode tubes.
Figure 4:
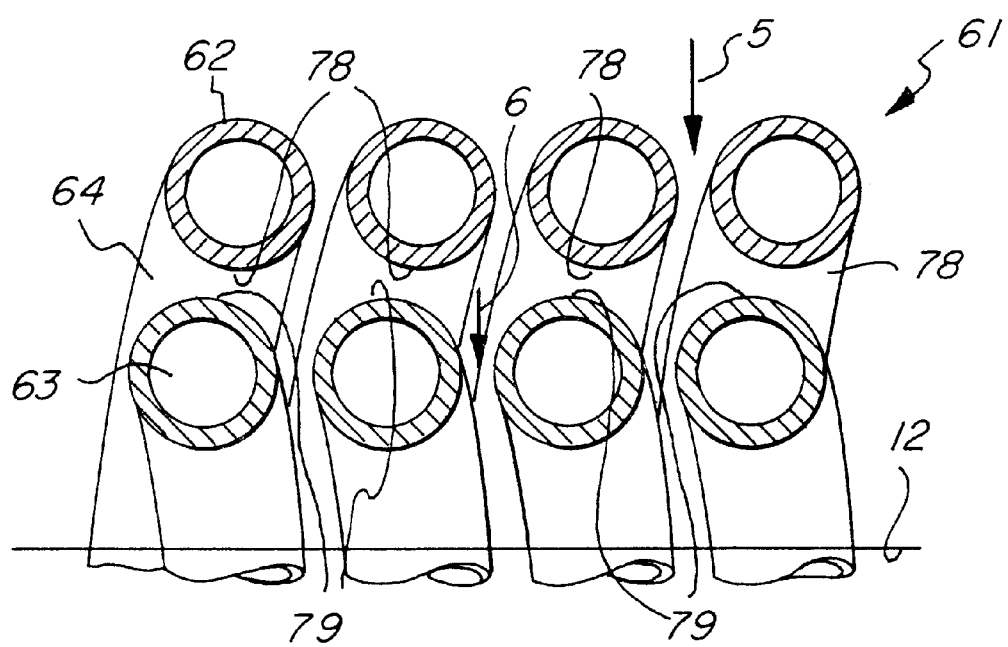
FIG. 4 is a fragmentary sectional view of another type of electrode tubes.

Other gas lasers with a coaxial design, namely gas laser 41 and gas laser 61, are shown in part in FIGS. 3 and 4.

In FIG. 3, a spatially annular discharge chamber 44 is bounded by electrode units in the form of electrode tubes 42, 43 which are fabricated of sheet metal and helically slit. Because of the slits, the tubes are permeable to laser gas in the gas intake direction 5 and gas outlet direction 6. The material of electrode tubes 42, 43 as such is not laser gas permeable, unlike the sintered electrode tubes.

In FIG. 4, the discharge chamber 64 of the gas laser 61 is bounded by electrode units in the form of concentric cooling coils carrying coolant which form electrode units like electrode tubes 62, 63. The electrode surfaces 78, 79 are provided in the form of the wall parts of electrode tubes 62, 63 about the discharge chamber 64. The laser gas permeability of the outer electrode tube 62 in the gas intake direction 5 and the inner electrode tube 63 in the gas outlet direction 6 is provided by the spacing between the coils of the electrode tubes 62, 63. In the case of the gas laser 61, the electrode tubes 62, 63 can be used for cooling the laser gas in addition to producing the electric field for the laser gas discharge. Electrode tubes formed from perforated sheet metal can also be used as an alternative to the electrode designs described.

Figure 5:
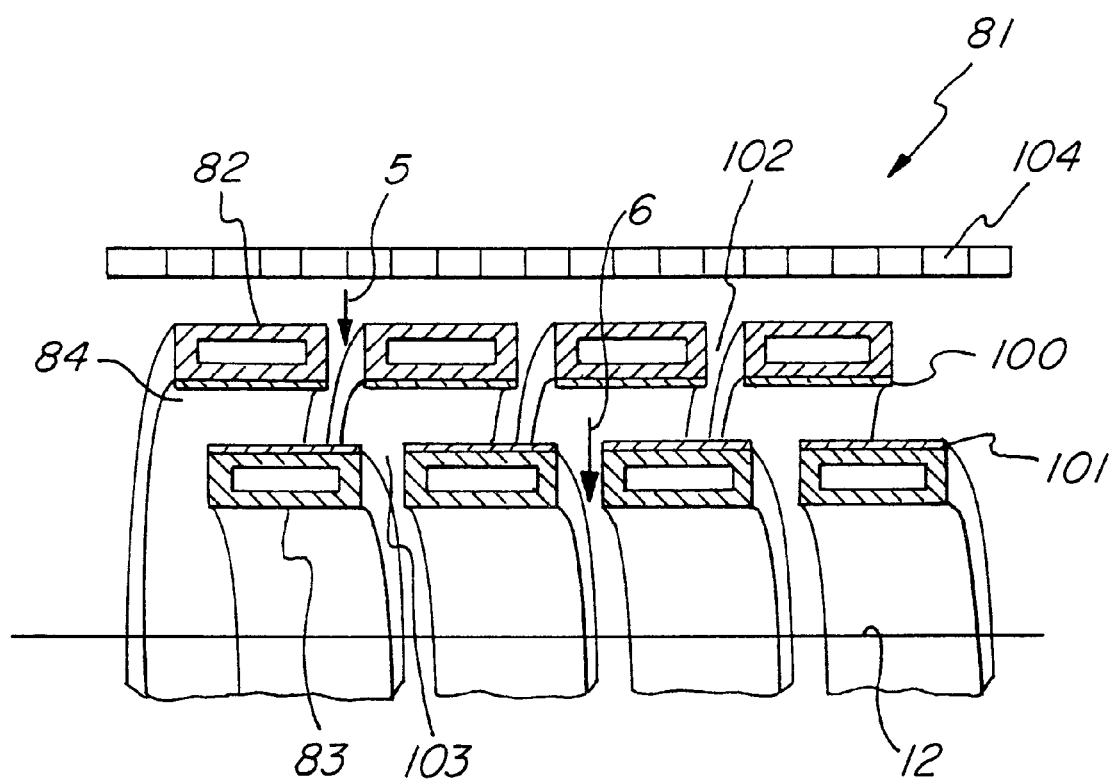
FIG. 5 is a fragmentary sectional view of another embodiment of a laser tube assembly.

FIG. 5 shows a gas laser 81 with a discharge chamber 84 bounded by concentric discharge chamber walls 100, 101 made of a dielectric material and extending in the beam propagation direction 12. The discharge chamber walls 100, 101 are disposed against the electrode tubes 82, 83, which are designed to correspond to electrode tubes 42, 43 in FIG. 3. Accordingly, electrode tubes 82, 83 are helically slit. The discharge chamber walls 100, 101 are also helically slit in the same way, and as a result form helical gas openings 102, 103 for the flow of the laser gas therethrough.

Laser gas is fed to the discharge chamber 84 by means of a laser gas pump of the type described above. The laser gas flows over a conductive grid 104 placed upstream from electrode tube 82, and it serves as a device for uniform distribution of the laser gas flowing in the gas intake direction 5 through the helical slits of the electrode tube 82 and through helical laser gas openings 102 of discharge chamber wall 100. Upstream from the conductive grid 104, is a laser gas cooler (not shown). A laser gas cooler is likewise placed downstream from electrode tube 83. Instead of the conductive grid 104 as a device for uniform distribution of the laser gas fed to the discharge chamber 84, a branched gas intake line can be provided. This type of branched gas intake line, like the conductive grid 104 shown in FIG. 5, produces a uniform laser gas flow inside discharge chamber 84 crosswise to the beam propagation direction 12. Laser gas leaves the discharge chamber 84 through helical laser gas opening 103 in discharge chamber wall 101 and through electrode tube 83, which also has helical slits. From the inside of electrode tube 83, the heated laser gas finally is drawn by means of the laser gas pump (not shown), and cooled at the laser gas cooler provided downstream from electrode tube 83.

Thus, it can be seen from the foregoing detailed description and attached drawings that the novel gas laser of the present invention provides a short path for the laser gas through the laser discharge chamber to minimize the temperature increase and increase efficiency.

Having thus described the invention what is claimed is:

1. A gas laser having:
   (a) a housing providing an elongated cavity;
   (b) a first elongated electrode tube within said cavity having an inner diameter;
   (c) a second elongated electrode tube disposed coaxially within said first electrode tube and having an outer diameter smaller than said inner diameter of said first electrode tube and spaced therefrom so as to provide a gas discharge chamber therebetween, said second electrode tube providing a gas exit chamber therewithin, said first electrode tube being spaced from the wall of said cavity to provide a gas entry chamber thereabout, said electrode tubes permitting gas to flow therethrough from said gas entry chamber to said gas exit chamber;
   (d) laser gas circulating means for supplying laser gas to said gas entry chamber and for withdrawing laser gas from said exit chamber;
   (e) power supply means for producing a discharge between said electrodes to generate a laser beam travelling axially within said gas discharge chamber; and
   (f) mirrors at the ends of said gas discharge chamber for reflecting the laser beam therebetween and providing an exit aperture for the laser beam.

2. The gas laser in accordance with claim 1 wherein there is included in said cavity a grid member about said first electrode tube to effect distribution of the laser gas along the length of said first electrode tube.

3. The gas laser in accordance with claim 1 wherein said electrode tubes are gas permeable.

4. The gas laser in accordance with claim 3 wherein said electrode tubes are sintered conductive material which is permeable to the laser gas.

5. The gas laser in accordance with claim 1 wherein said laser discharge chamber has at least one wall element extending thereabout and having openings therein for flow of the laser gas therethrough.

6. The gas laser in accordance with claim 1 wherein said electrode tubes are fabricated from a material which is substantially gas impermeable and have helical slits therein to permit the gas flow therethrough.

7. The gas laser in accordance with claim 1 wherein said electrode tubes provide passages for flow of coolant therethrough and wherein there is included coolant circulating means providing flow of coolant therethrough.

8. The gas laser in accordance with claim 6 wherein said electrode tubes are helical and the coils thereof are axially spaced.

* * * * *